Aug. 6, 1963  J. W. LAWLESS  3,099,876

TOOL FOR REMOVING SPRING PINS

Filed May 17, 1960

*INVENTOR.*
JOHN W. LAWLESS
BY
Kenway, Jenney, Witter & Hildreth
ATTORNEYS

United States Patent Office 3,099,876
Patented Aug. 6, 1963

3,099,876
TOOL FOR REMOVING SPRING PINS
John W. Lawless, Shelburne Falls, Mass., assignor to Mayhew Steel Products, Inc., Shelburne Falls, Mass., a corporation of Massachusetts
Filed May 17, 1960, Ser. No. 29,760
1 Claim. (Cl. 29—229)

This invention relates to a novel and improved tool for removing a spring pin from within a work piece.

Spring pins, or roll pins, are commonly used as locating pins, pivot pins, keys, etc., and in place of other types of fasteners such as screws or rivets to hold parts in assembly. A spring pin comprises a generally cylindrical resilient metal tube which is provided with a slot extending over the entire length of the tube and with the bordering edge portions of the slot being spaced apart a substantial distance. The primary advantage of a spring pin is the facility with which it may be installed and the high gripping force which it provides. To install a spring pin requires but two simple operations, namely the drilling of a hole in the part in which the pin is to be installed and the driving of the pin into the hole. As the pin is driven into the part the bordering edges of the slot in the pin are forced into near engagement. The deforming of the pin to bring the edges of the slot into near engagement requires a considerable force. Accordingly, the pin when installed exerts considerable force on the part or parts in which it is received. While the high gripping force provided by the spring pin is obviously advantageous, it presents a problem when it is desired to remove the pin. For example a spring pin having a nominal outside diameter of ¼ inch and having a length of 1 inch in engagement in steel, may require a force of as high as 2,000 pounds to remove it. A conventional method of removing spring pins is to insert a pin punch or the like into one end of the spring pin and attempt to drive the spring pin out of the hole. Where a tapered punch is used the punch taper tends to expand the pin against the wall of the hole and impede removal of the pins as well as possibly to cause scoring of the wall of the hole. Another method of removing a spring pin is to attempt to drive the pin out of the hole with a drift pin or the like. However, it is difficult to center the drift pin relative to the spring pin particularly with small diameter pins, for example 1/16 inch in diameter. As a result often the drift pin will gouge the portion of the work surrounding the spring pin. Further, it is difficult to keep the drift pin centered in the hole after the pin has been started out, so that scoring or gouging of the wall of the hole often results. An additional problem in removing spring pins arises because spring pin lengths may be as much as 18 times the diameter of the pin. As will be apparent it is often difficult to find a conventional tool which will have the correct diameter and at the same time will have a length which is sufficient to permit driving of the spring pin completely out of the hole. It is important that the spring pin be completely driven from the hole inasmuch as even with a small portion of the spring pin left in a hole, the gripping force of the pin may be sufficiently high to preclude final removal of the pin by such means as gripping it with a pair of pliers and pulling it from the hole. For example, a ¼ inch spring pin with only ¼ inch of its length engaged in steel may require a removal force of as high as 600 pounds.

Accordingly, it is the object of this invention to provide a novel and improved tool for removing spring pins which will permit an unskilled worker to remove a spring pin easily without gouging or scoring of the work in which the pin is installed.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claim.

Figure 1:
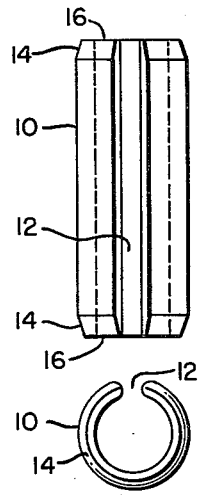
FIG. 1 is a side view of an exemplary spring pin.
Figure 2:
FIG. 2 is an end view of the spring pin of FIG. 1.

With reference to the drawings, and particularly FIGS. 1 and 2, an exemplary spring pin, of a type with which this invention is concerned, is generally indicated at 10 and can be seen to comprise a generally cylindrical metal sleeve which is provided with a slot 12 in the wall thereof. The slot 12 extends throughout the entire length of the sleeve in a direction parallel to the sleeve axis. The slot 12 is relatively wide so that the bordering edges of the slot are spaced apart a substantial distance. The pin is constructed so that it has a maximum outside diameter which is greater, by a predetermined amount, than the nominal diameter hole i.e. bore means size with which the pin is intended for use. Accordingly, in order to set the pin into a hole, the pin must be deformed so as to move the bordering edge portions of the slot 12 toward each other. The pin is dimensioned so that when the pin is inserted into a properly sized hole, the bordering edge portion of the slot will not come into engagement, although it is preferred that they come into near engagement. The wall of the pin is relatively thick compared to the pin diameter, and it will therefore be apparent that considerable force is required to drive the pin into a hole. In order to facilitate deformation of the pin during installation thereof, the ends of the pin are preferably chamfered as at 14. The chamfering of the ends of the pin also reduces the possibility of scoring of the wall of the hole as the pin is driven into the hole. In order to provide a good bearing surface against which to drive, the ends of a spring pin are preferably flat and lie in planes extending at right angles to the pin axis.

Figure 3:
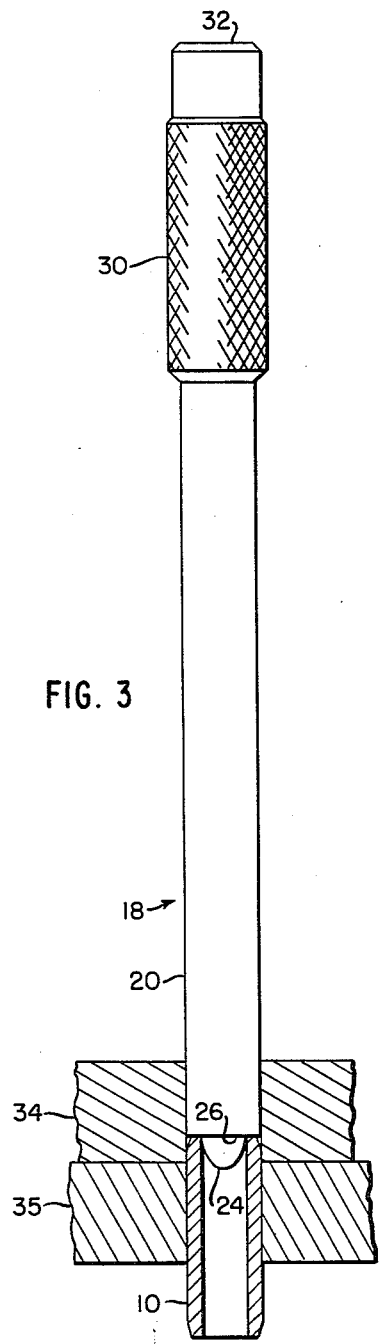
FIG. 3 is a fragmentary, elevational view, partly in section, of a spring pin removing tool constructed in accordance with the present invention and illustrating the use of the tool in removing a spring pin from a hole in a workpiece.
Figure 4:
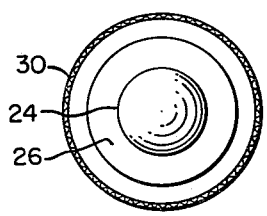
FIG. 4 is an enlarged end view of the tool of FIG. 3.

With reference to FIGS. 3 and 4, a spring pin removing tool constructed in accordance with the present invention is indicated generally at 18 and comprises an elongated cylindrical metal shank 20. The shank 20 has a diameter which is substantially equal to the nominal diameter of a hole with which a particular size spring pin is intended for use. In other words, the diameter of the shank is substantially equal to the nominal outer diameter of a spring pin of particular size with which the tool is intended for use. By defining the shank diameter as being substantially equal to the nominal diameter of the hole or nominal outer diameter of the pin is meant that the shank will be freely receivable within a hole having a diameter within the specified tolerance limits but will not be overly loose in a hole having a maximum permissible diameter. Ideally, the shank should have a diameter just slightly less than the minimum permissible diameter for the hole so that a sliding fit is provided. The diameter of the shank 20 is constant over the entire length of the shank, and it is preferred that the peripheral surface of the shank be smooth over the entire length of the shank in order to avoid scoring of the wall of a hole during use of the tool to remove a spring pin.

One end of the shank is provided with a reduced diameter integral pilot projection 24 which in the specific embodiment of FIGS. 3 and 4 is generally semi-ellipsoid in configuration so as to be generally tapered with a rounded end. The projection 24 serves to locate the adjacent end of the shank coaxially of the spring pin during use of the tool in the removal of the pin. The specific configuration of the projection 24 may vary, although it is preferred that it be of generally tapered configuration in order to facilitate initial locating of the projection within one end of the pin. The maximum base diameter of the projection 24, at its juncture with the end of the shank 20, is preferably substantially equal to the inner diameter of the spring pin with which the tool is intended for use, the inner diameter of the pin being in this case measured when the pin is inserted in a hole and the pin deformed. The projection 24 is dimensioned so that when it is inserted into one end of a pin, the adjoining end of the shank will be engaged with the end surface 16 of the pin. As most clearly shown in FIG. 4 this end surface of the shank is a flat annular shoulder 26 surrounding the projection 24 and preferably lying in a plane which is perpendicular to the longitudinal axis of the shank. Inasmuch as the diameter of the shank 20 is substantially equal to the nominal outer diameter of the spring pin and inasmuch as the pilot projection 24 has a maximum base diameter at its juncture with the shank which is substantially equal to the inner diameter of a deformed spring pin, it can be seen that the width of the shoulder 26 is substantially equal to the thickness of the material forming the spring pin.

Figure 5:
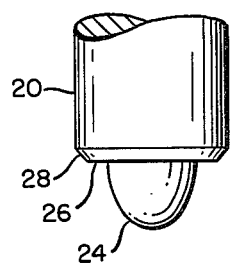
FIG. 5 is a fragmentary, enlarged elevational view of an alternative form of the end of the tool of FIG. 3.

In order to facilitate the entrance of the end 26 of the shank into a hole during removal of a spring pin, the end of the shank may be chamfered as shown in FIG. 5. The chamfering of this end of the shank will reduce the width of the shoulder 26. Accordingly, it is preferred that the dimension of the chamfer 28 be selected so that the shoulder 26 is at least as wide as the flat end portion 16 of the pin in order to assure that the full area of the flat surface 16 is in engagement with the end shoulder on the shank. The tool 18 further includes a hand grip portion 30 extending coaxially from the end of the shank 20 opposite the pilot projection 24. While the hand grip portion 30 may be a part separate from the shank 20, it is preferred that it be fabricated integrally with the shank. The end 32 of the tool opposite the pilot 24 is preferably provided with a flat surface extending radially of the shank and which is adapted to be struck by an impact tool such as a hammer or the like.

With reference to FIG. 3, when the tool is used such as to remove a spring pin from a pair of work pieces 34, 35 fastened together by the pin, the pilot projection 24 is inserted into one end of the pin, the shoulder 26 is engaged in the end of the pin, and the opposite end 32 of the tool is struck with a hammer or the like to move the pin longitudinally and outwardly of the holes in the work pieces receiving it. The pilot projection 24 serves to center the shank 20 relative to the hole thus tending to eliminate any gouging of the portion of the work piece surrounding the hole during the initial removal of the pin. The sizing of the shank relative to the nominal diameter of a pin with which the tool is intended for use assures that as the shank 20 enters the hole in the work piece, the shank will be supported by the wall of the hole to tend to eliminate canting of the shank. The constant diameter and smooth surface of the shank assures that the shank will not stick in the hole. The substantially coplanar engagement of the flat annular shoulder 26 on the end of the shank 20 and the flat end surface 16 on the pin assures an efficient transmission of force longitudinally of the pin. Additionally, it will be seen that this end-to-end engagement of the tool and pin assures that there will be no tendency of the tool to spread the pin and increase the force required for removal.

Spring pins are commonly commercially stocked in a range of nominal diameters from $\frac{1}{16}$ inch to $\frac{1}{2}$ inch and in lengths from 1 inch in the $\frac{1}{16}$ inch size to 4 inches in the $\frac{1}{2}$ inch size. Accordingly, it is contemplated that spring pin removal tools of the present invention will be provided in sets to cover the range of sizes of spring pin diameters most commonly available. Additionally, the shank 20 of each nominal size spring pin removing tool should be of a length which is at least equal to the maximum length commonly stocked for the spring pin with which the tool is to be used. For example, in a tool to be used with $\frac{1}{4}$ inch diameter spring pins which have a maximum commonly stocked length of $3\frac{1}{2}$ inches, the shank should be at least $3\frac{1}{2}$ inches long and preferably longer. Also, inasmuch as spring pins are commonly hardened, it is preferred that at least the pin engageable end of the shank of the tool 18 be provided with a sufficient hardness to avoid gouging of the flat shoulder 26.

It can thus be seen that there has been provided a novel and improved tool for removing spring pins which facilitates the removal of a pin from the hole in which it is installed. Even in the hands of an unskilled workman, the tool of this invention will permit spring pin removal without any gouging or scoring of the work piece and without any jamming or breaking off of the tool within the work piece.

Inasmuch as changes could be made in the above construction and different embodiments of this invention could be made without departing from the scope thereof, it is intended that all matter contained in the above description or shown in the accompanying drawings shall be interpreted as illustrative and not in a limiting sense.

It is also to be understood that the language used in the following claim is intended to cover all of the generic and specific features of the invention herein described and all statements of the scope of the invention which, as a matter of language, might be said to fall therebetween.

I claim:

An assembly comprising:

workpiece means having bore means of substantially uniform diameter;

a spring pin comprising a resilient, generally cylindrical member having a longitudinal slot, said spring pin being radially compressed by and positioned within said bore means; and a spring pin removing tool consisting of a unitary structure comprising:

a smooth surfaced, elongated, metal, and cylindrical shank having a constant diameter substantially equal to the diameter of said bore means and the outer diameter of said compressed spring pin positioned therein, said shank having a portion extending into said bore means, said shank portion being slideably supported by the wall of said bore means throughout its length whereby said shank is supported by said wall adjacent said spring pin, one end of said shank being provided with a short pilot projection extending directly into one end of said spring pin, which projection is of a generally tapered configuration, said pilot projection extending coaxially from said one end of the shank and having a maximum diameter substantially less than the diameter of said shank and no greater than, but substantially equal to, the inner clearance diameter of the compressed spring pin, whereby said pilot projection centers said one end of the shank relative to the pin without spreading said pin during its removal, said one end of the shank further being provided with a continuous, flat, and annular shoulder surrounding said pilot projection at the juncture thereof with the shank and lying in a plane extending at right angles to the shank axis, said flat, annular shoulder being in direct driving engagement with said spring pin, a chamfered shank portion surrounding said flat, annular shoulder and extending between said shoulder and the cylindrical periphery of said shank, and an integral, knurled, and hand engageable gripping portion extending from the other end of the shank, the end of said gripping portion opposite the shank being provided with a surface engageable by an impact tool.

References Cited in the file of this patent
UNITED STATES PATENTS

| | | |
|---|---|---|
| 1,510,866 | Seppmann | Oct. 7, 1924 |
| 1,530,866 | Wakefield | Mar. 24, 1925 |
| 1,588,687 | Richter | June 15, 1926 |
| 1,740,590 | Hartman | Dec. 24, 1929 |
| 1,863,956 | Wilson | June 21, 1932 |